United States Patent [19]

Rivers

[11] Patent Number: 4,463,475
[45] Date of Patent: Aug. 7, 1984

[54] JOINT LOCKING MECHANISM

[76] Inventor: Robert Rivers, 1114 Linden Ave., Sharon Hill, Pa. 19079

[21] Appl. No.: 377,067

[22] Filed: May 11, 1982

Related U.S. Application Data

[63] Continuation-in-part of Ser. No. 084,720, Oct. 15, 1979.

[51] Int. Cl.³ ............................................... E05D 7/06
[52] U.S. Cl. ........................................ 16/241; 16/245; 16/338; 16/341
[58] Field of Search ................. 16/240, 241, 245, 248, 16/338, 341, 375; 160/229 R, 220, 351, 233, 185, 135; 52/71, 583, 584, 585; 403/171, 176, 306

[56] References Cited

U.S. PATENT DOCUMENTS

| | | | |
|---|---|---|---|
| 543,906 | 8/1895 | Spaulding | 160/135 X |
| 2,683,279 | 7/1954 | Okerlund et al. | 16/245 |
| 3,889,736 | 6/1975 | Firks | 160/229 R X |

FOREIGN PATENT DOCUMENTS

| | | | |
|---|---|---|---|
| 2262770 | 2/1974 | Fed. Rep. of Germany | 16/DIG. 40 |
| 2420864 | 4/1974 | Fed. Rep. of Germany | 16/DIG. 40 |
| 2450333 | 10/1980 | France | 16/242 |

Primary Examiner—Fred Andrew Silverberg
Assistant Examiner—C. Yu
Attorney, Agent, or Firm—David Edwards

[57] ABSTRACT

A hinge lock mechanism (a joint fastener) for lockingly joining at least two panels together at any angle comprising two arms. One of the arms has threads thereon and screws into a floating nut that is located in one of the panels and the other arm has a conical V shaped depression thereon that communicates with a clamping device that has a set screw thereon that is urged against the conical V shaped surface of the arm for tightening the panels together. This hinge lock mechanism forms a continuous edge at the junction of the two panels and cannot be seen from the desired side of the panels.

8 Claims, 13 Drawing Figures 4,463,475

JOINT LOCKING MECHANISM

BACKGROUND OF THE INVENTION

This invention is a continuation-in-part of Ser. No. 084,720, filed Oct. 15, 1979.

This invention relates to a hinge lock mechanism for joining sight dividers, or other moveable or dismountable panels or partitions, for use in erecting temporary or permanent, non-structural walls, panels, or other building constructions. More particularly, the hinge lock mechanism of this invention can be used for any type of temporary or permanent wood or wood type construction from furniture, display units, and exhibits to building construction.

Prior to the present invention, moveable panels could only be joined together having unattractive seams. For example, U.S. Pat. Nos. 3,428,108 and 3,889,736) show moveable panel connectors where the desired edge of the panels are not continuous and the connectors are visible making the display unattractive. The panels in these patents must also have a particular design making the use of the connectors limited. The panels in the present invention can be made from any wood, masonite, plastic (e.g. styrofoam), or metal; hence, the hinge lock mechanism is very versatile.

SUMMARY OF THE INVENTION

This invention is directed to a hinge locking mechanism for joining two or more panels together at any angle or configuration comprising at least two arms joined together by either a swivel joint as described infra or a variable angle or fixed angle hinge locking mechanism as described in copending application Ser. No. 084,720 which is herein incorporated by reference.

In this improved hinge locking mechanism one of the arms has threads thereon and another of the arms has an exaggerated conical V shaped depression therein with the degree of slope or inclination from a horizontal plane of an angle of from about 25 to about 50 degrees. The arm with the threads thereon is locked into the panel with a floating nut retainer means comprising of a housing with anchoring fins thereon for securing the housing into the panel, a loosely fitting nut that is located in a slightly oversized channel in the center of the housing so that the nut fits loosely, and a passageway through the housing which is slightly larger than the threaded hole of the nut so that the nut fits loosely. The arm with the exaggerated conical V shaped depression is locked into the panel with a clamping means comprising a housing with anchoring fins thereon for securing the housing into the panel, a horizontal passageway through which the arm passes, a threaded hole which is perpendicular to and communicates with the passageway, and a set screw with a conical shaped end that has the same slope as the conical V shaped depression of the arm that screws down the threaded hole. The V shaped depression in the arm and the threaded hole in the clamping means are aligned so that the threaded hole is directly over the outer slanted conical surface away from the center of the mechanism. When the set screw is tightened down the hole against the conical surface of the arm, the conical surface of the set screw rides down the slanted conical surface of the depression in the arm urging the arm away from the other end of the mechanism which is secured in the other panel so that the panels are tightened together making a tighter continuous seam.

In other embodiments, the arm with the machine threads thereon that locks into a floating nut retainer means can be replaced with an arm having wood screw threads thereon for screwing into a wood panel via a pilot hole without prior drilling of a channel or with an arm having a slanted flat surface thereon which is secured into the panel by a clamping means as described in copending application Ser. No. 084,720. Multiple arms, fixed angle locking mechanism having three or four arms in the Y shape, cross shape, T shape, etcetera can also be used in this invention. In each of the above mentioned embodiments, the clamp tightening means is used. However, this invention also encompasses the use of the floating nut retainer means by itself with conventional screws for making connections as will be described hereinafter. The hinge lock mechanism of this invention can be made in a number of sizes to facilitate different construction requirements.

This invention is further directed to a portable, multiple panel, display unit used as sub-structure for exhibits, booths, classroom dividers, art gallery partitions, and the like. This display unit comprises several individual detachable panels. Replaceable hinge lock mechanisms (called joint fasteners) are placed into predrilled holes on bevelled ends of panels to join the panels together. The edge of the panels are bevelled to the desired angle so that the point of the bevelled edge of the panels are abutted together to give the appearance of being a continuous, seamless edge that provides a pleasing appearance for the unit. Any number of panel accessories (i.e., light boxes, shelves, etc.) or flat panels (with or without cut-outs) made to the desired dimension can be used. In so doing, the number of sides can be increased or decreased to form any desired shape, thus lengthening or shortening the display unit.

This invention is further directed to a method fo assembling a construction using the hinge lock mechanism comprising bevelling the ends to the desired angles and drilling holes in the ends of the desired number of panels for receiving hinge lock mechanisms noted above, using a fixed angle, swivel, or variable angle hinge lock mechanism of the desired angle, sliding one arm of the mechanism into the hole in the panel end, screwing it into the floating nut retainer means until the arm is in the desired position, inserting the panel to be joined onto the other arm of the mechanism and through a rod clamping means, and tightening the set screw of the clamping means onto the conical V shaped depression of the arm urging the arm away from the other arm thus tightening the panels into position creating a tight continuous seam. The floating nut retainer means permits adjustments of the panels because of the hole drilling inaccuracies in order to assure exact continuous seams. The number and size of the hinge mechanisms used in a construction depend on the type of construction; for example, a small cabinet would require fewer mechanisms of smaller sizes than a large display unit.

DESCRIPTION OF DRAWINGS

Other advantages of the invention will become apparent from the detailed description below and upon reference to the following drawings.

DETAILED DESCRIPTION

Figure 1:
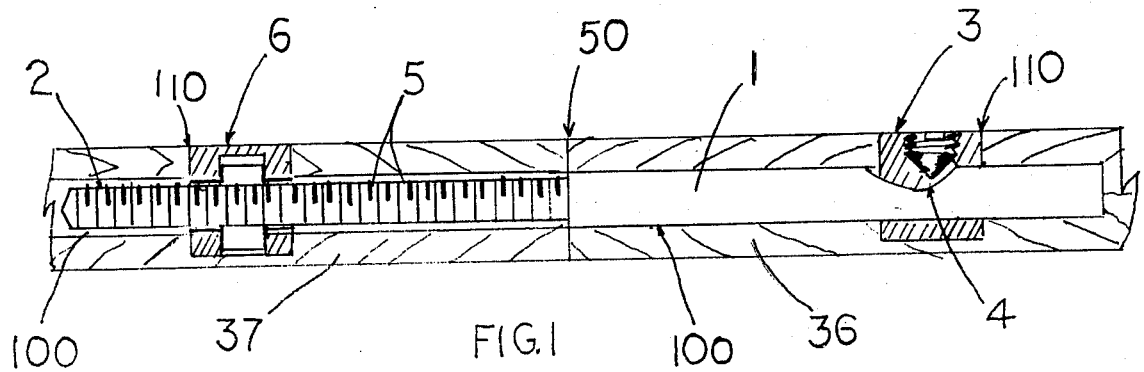
FIG. 1 is a cross-sectional side view of a 180 degree fixed angle hinge lock mechanism with a threaded arm connecting two panels together.

FIG. 1 shows a permanent angle of 180 degrees hinge lock mechanism having two arms 1 and 2. Arm 1 has an exaggerated conical V shaped depression 4 therein that communicates with clamp-tightening means 3 situated in a predrilled hole 110 in panel 36. Arm 2 has machine threads 5 thereon and screws into floating nut retainer means 6 that is situated in a predrilled hole 110 in panel 37.

Figure 4:
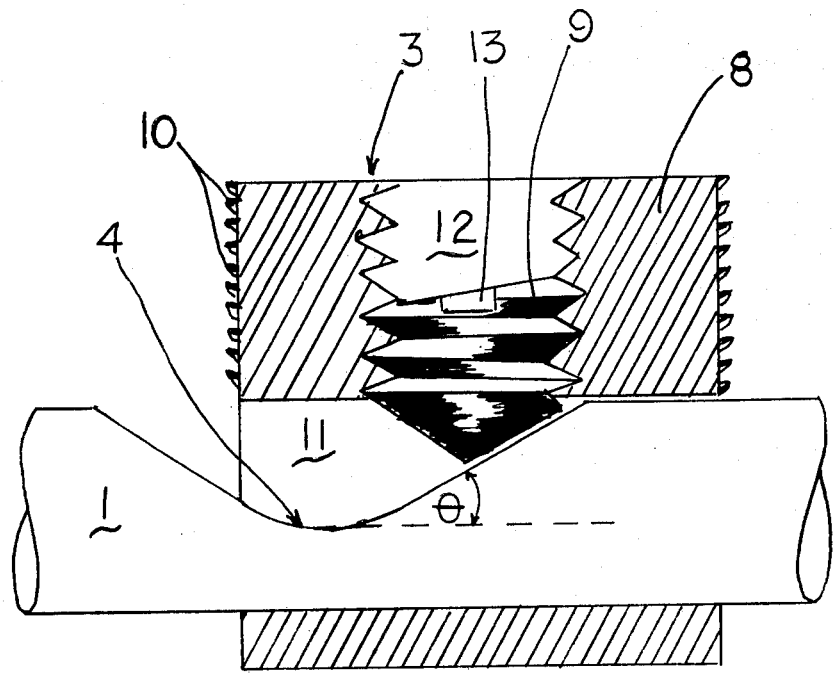
FIG. 4 is a cross-sectional enlarged clamp-tightening means.
Figure 5:
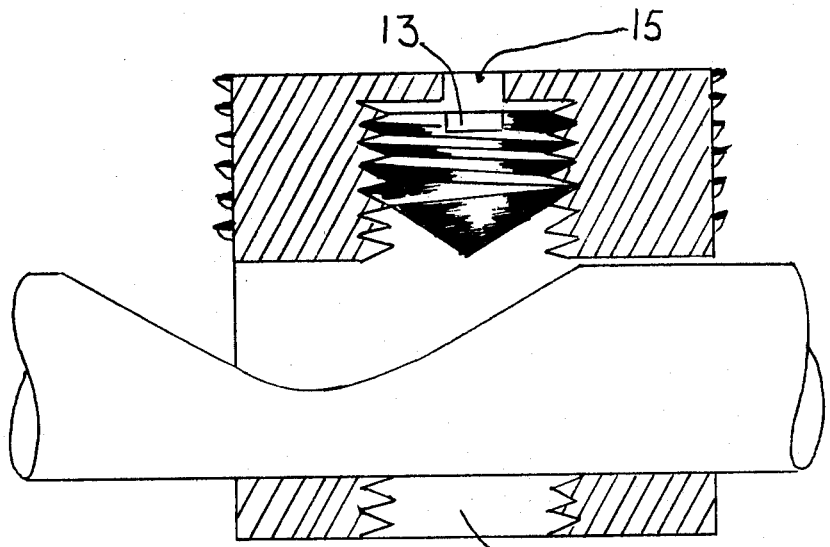
FIG. 5 is a cross-sectional enlarged clamp-tightening means for use in a very thick material wherein the set screw cannot be completely removed from the top thereof.

FIGS. 4 and 5 show enlarged detailed views of the clamp-tightening means 3 which is composed of a housing 8, fins 10 for anchoring the housing 8 into a drilled hole in a panel, passageway 11 for receiving arm 1, channel 12 with threads therein that communicates with passageway 11, and set screw 9 with wrench slot 13 that rides in the threads of channel 12. The bottom end of set screw 9 is conical and has the same slope as the outer slope of the conical V shaped depression 4 in arm 1. The angle θ of the inclination of the outer slope of 4 is in the range of from about 25 to about 50 degrees. As can be readily seen in FIG. 4 the set screw 9, when screwed down against the outer slope of 4, rides down the outer slope thus urging the arm away from the other arm 2. This tightens and hold fast the panels together as will be described hereinafter. FIG. 5 is a modification of FIG. 4 wherein channel 12 extends all the way through the bottom stopping short of coming through the top; the top of the housing 8 only has an opening 15 that aligns with set screw slot 13 so that a set screw wrench can be inserted in the slot 13 for tightening and loosening set screw 9 against arm 1. This modified construction of clamp tightening retainer means 3 is to be used especially when inserting the locking mechanism in very thick material where the set screw may be completely removed from the housing and mislaid in the material making it necessary to take the connection apart and reassembling it before using. This modification prevents the above mentioned inconvenience.

Figure 6:
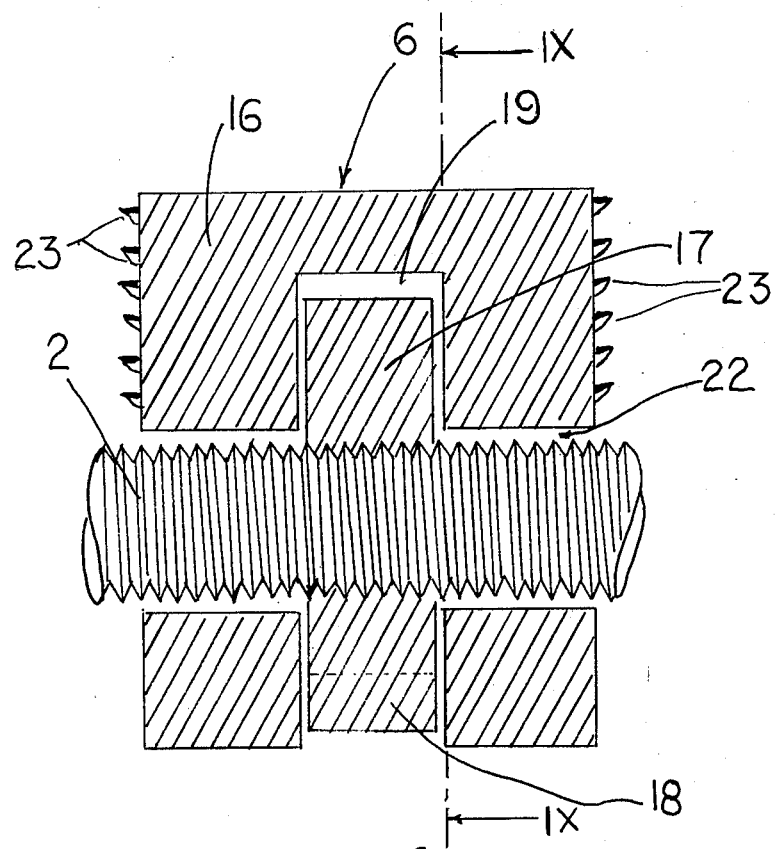
FIG. 6 is a cross-sectional enlarged view of the floating nut retainer means.
Figure 9:
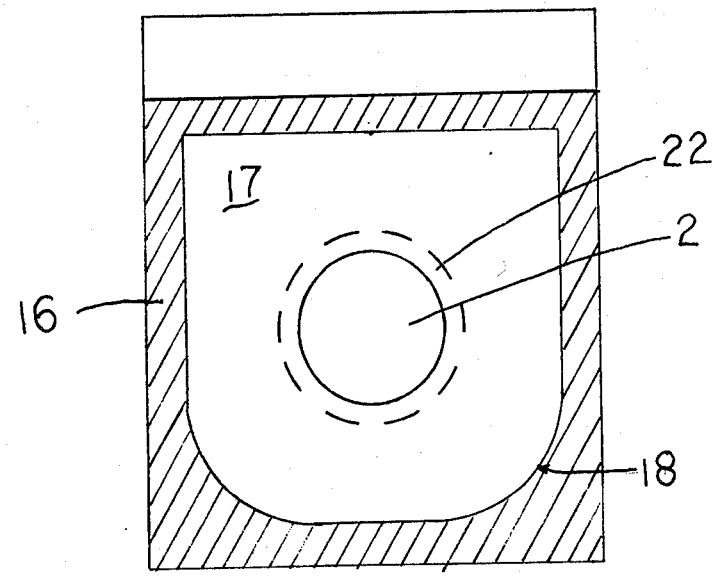
FIG. 9 is a cross-sectional enlarged view of FIG. 6 along lines IX—IX.

FIGS. 6 and 9 show an enlarged detailed view of the floating nut receiver means 6 which is composed of housing 16 with anchoring fins 23 thereon, nut 17 with rounded bottom corners 18, rectangular opening 19, and passageway 22. The rectangular opening 19 is slightly larger than nut 17 so that nut 17 has limited movement therein. The bottom two corners 18 of the nut 17 are rounded (seen better in FIG. 9) in order to permit the top of the nut alone to hit the top of the housing for limited movement thereof while the bottom part of the nut is permitted to move freely without touching or damaging the plywood it is in. It should be noted that the housing 16 can be made of metal, hard wood, or plastic but the nut can be made of only metal or heavy plastic. When housing 16 is made of a hard wood, it can be stained or finished to resemble the wood material it is inserted in and glued in place permanently, if so desired. When housing 16 is made of a metal or hard plastic, it will be in a finished form so that it is attractive. The passageway 22 is slightly larger than the threaded hole in the nut 17 so that the arm 2 after being secured in nut 17 can be moved around in passageway 22 for making panel joint adjustments of the material.

Figure 8:
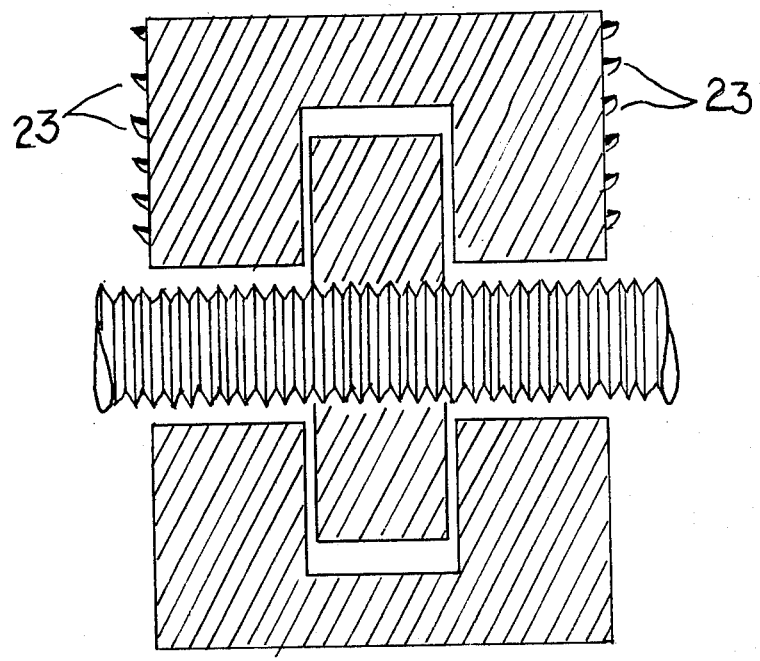
FIG. 8 is a cross-sectional enlarged view of another embodiment of the floating nut retainer means for use in thick material wherein the nut cannot fall out of the open end as in FIG. 6.

FIG. 8 shows another embodiment of the floating nut retainer means 6 for use in thick material. The nut 17 is completely enclosed at the bottom so that when this means is inserted into a deep hole, the nut will fall out into the hole making it necessary to remove 6 from the material inorder to preassemble it again before inserting back into the material.

Figure 2:
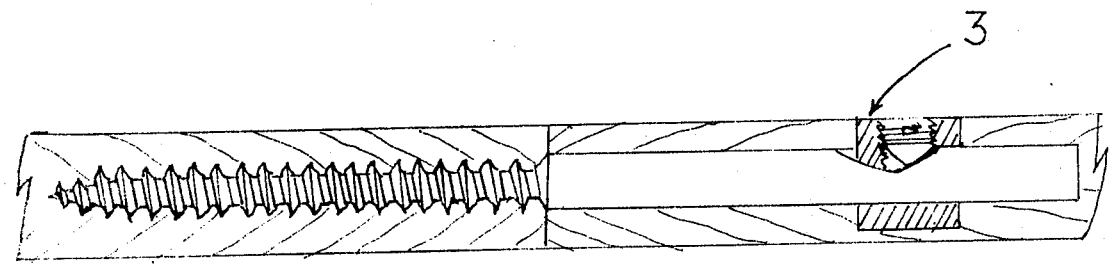
FIG. 2 is a cross-sectional side view of a 180 degree fixed angle hinge lock mechanism that has one arm with wood threads thereon connecting two panels together.

FIG. 2 shows a modification of FIG. 1 where arm 2 is in the form of a wood screw eliminating the need for floating nut retainer means 6. The wood screw end of the mechanism is first screwed into the panel via a pilot hole and then the other arm is affixed into the other panel as will be further described hereinafter.

Figure 3:
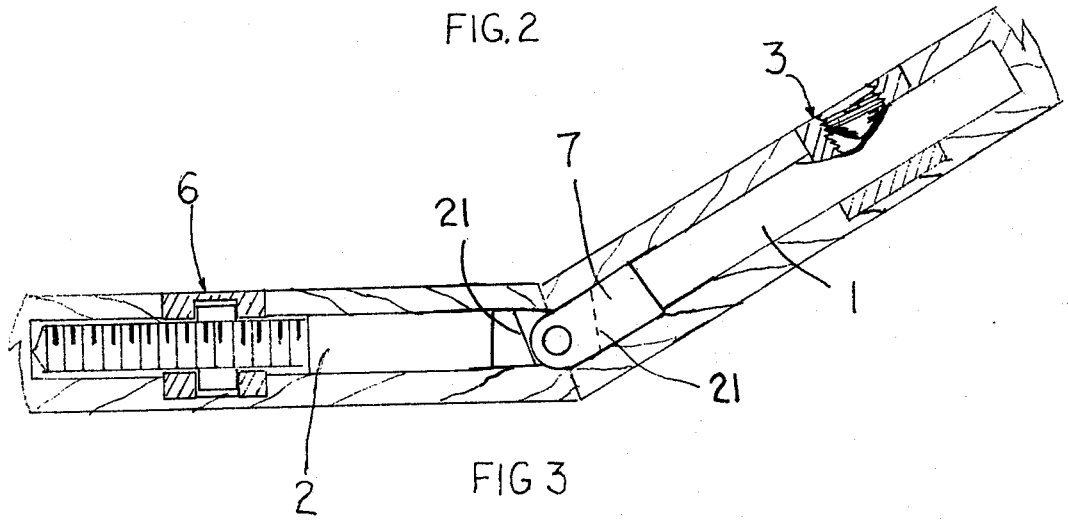
FIG. 3 is a cross-sectional side view of a swivel hinge lock mechanism for connecting panels at the angle at which they are bevelled.

FIG. 3 shows the embodiment where the two arms 1 and 2 are joined together with a swivel 7 that can make the arms assume angle from about 60 to about 300 degrees depending on how the panels are bevelled back. Both arms are permanently attached to swivel 7. Swivel 7 has slanted shoulder surfaces 21 that permit the swivel 7 to assume the smaller angles. In FIG. 3 threaded arm 2 is used with floating nut retainer means 6 and the conical V shaped depression arm 1 is used with clamp tightening means 3. It should be understood that other variations and combinations of different arms can be used in this invention without departing from the scope and spirit of the invention.

Figure 7:
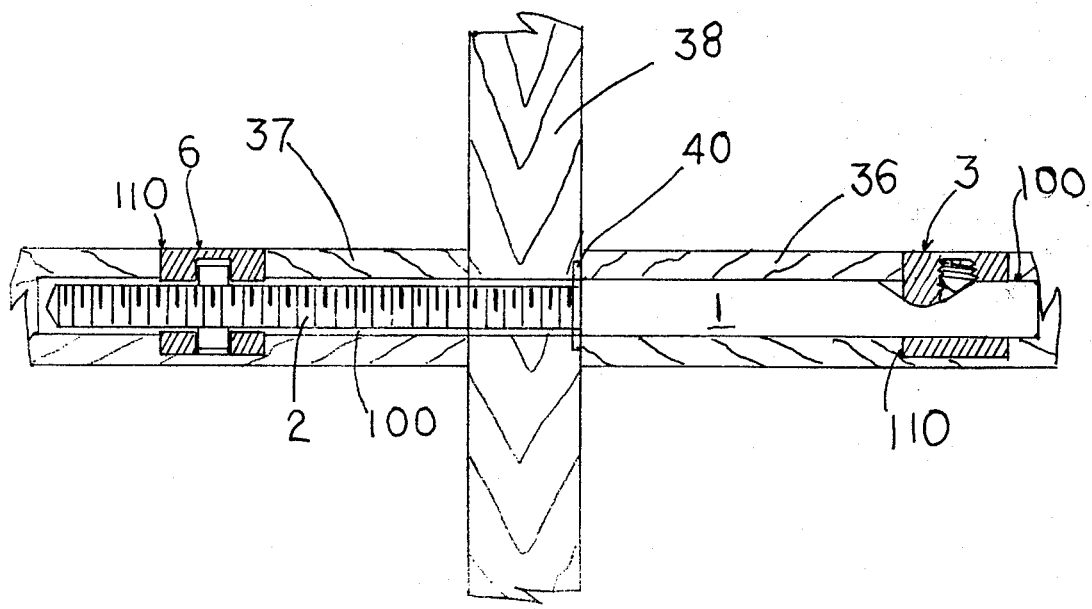
FIG. 7 is a cross-sectional view of a 180 degree fixed angle hinge lock mechanism joining three panels together.

FIG. 7 shows combining three panels 36, 37, and 38 together using the 180 degree fixed angle locking mechanism. Washer 40 is placed in a recessed groove in panel 38 in order to hold panels 37 and 38 together before placing panel 36 onto arm 1.

Figure 10:
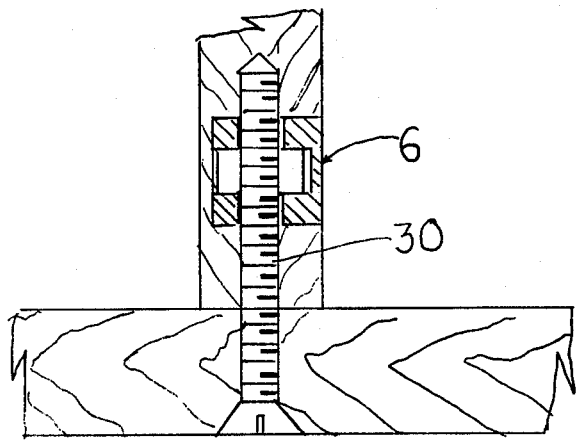
FIG. 10 is a cross-sectional side view of a joint connection using the floating nut retainer means alone.
Figure 11:
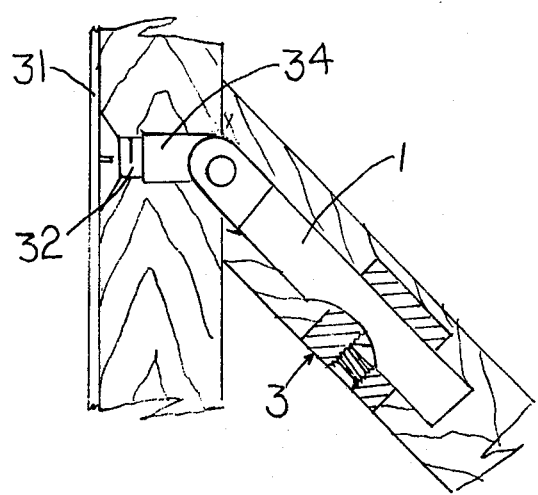
FIG. 11 is a cross-sectional side view of a swivel hinge lock mechanism having a clamp tightening means for one arm and a threaded socket as the other.
Figure 12:
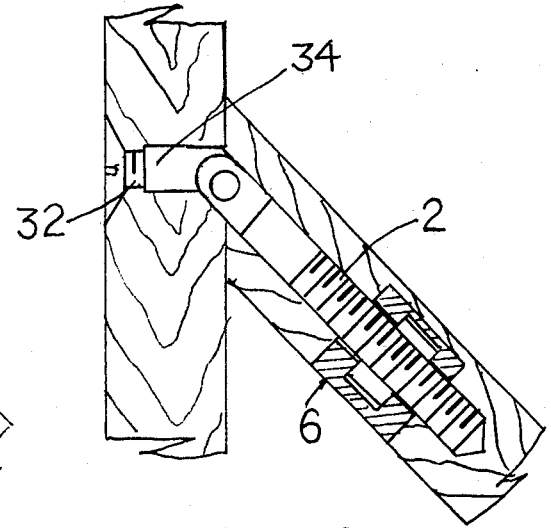
FIG. 12 is a cross-sectional side view of a swivel hinge lock mechanism having the floating nut retainer means for one arm and a threaded socket as the other.
Figure 13:
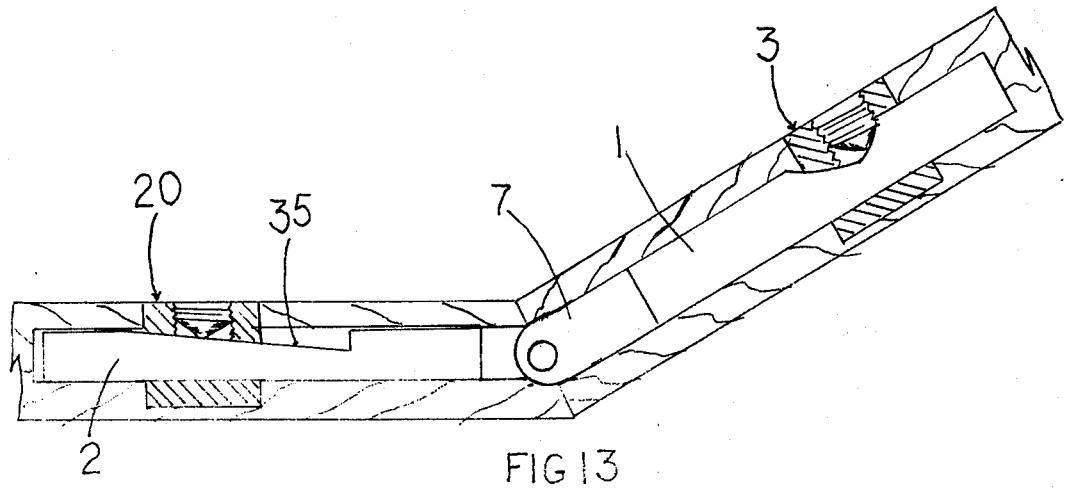
FIG. 13 shows the embodiment of the hinge lock mechanism having the clamp tightening means for one arm and the clamping means of Ser. No. 084,720 used with the arm having a flat slanted surface.

Other embodiments of the hinge lock mechanism are illustrated in FIGS. 10 to 13 which are especially useful in permanent construction. FIG. 10 shows the use of a regular flat head screw 30 (the screw may also have a round head or be in any other form that is well known in the art) used along with the floating nut retainer 6 for bolting two panels together at right angles to each other. This type of connection would be commonly used in furniture, cabinets, or in building construction. FIG. 11 shows a modification of the swivel hinge lock mechanism having arm 1 that is secured with the clamp tightening means 3 and a screw for bolting two pieces of material together at the desired angle. Covering 31 is shown that may be a thin sheet of plastic, Formica, Masonite, or any other laminate material which is suited for furniture, panels, and shelves or where a particular aesthetic effect is desired. FIG. 12 shows another embodiment of the swivel hinge lock mechanism having arm 2 that is secured with the floating nut retainer means 6. In this embodiment the arm 2 of the mechanism must be screwed into the retainer means 6 before securing the mechanism with screw 32. In each of these embodiments arms 1 and 2 are permanently attached to the swivel 7 with the end 34 of swivel 7 being a threaded socket for accepting a screw 32 or any other means with threads thereon. FIG. 13 shows the swivel hinge lock mechanism having arms 1 and 2 wherein arm 2 has a flat slanted surface 35 that is secured in the panel by clamping means 20 as described in copending application Ser. No. 084,720.

Styrofoam, a very light porous plastic, is especially desirable for use as panels for portable display units or where light weight construction is desired, i.e., cabinets, light boxes, etc. The basic styrofoam construction for a panel will have an outside frame of narrow strips of wood (such as one inch by two or three inches) joined to form the outer perimeter. The styrofoam is inserted in its center fitting tightly. The wood frame is merely to protect the edges of the styrofoam and to facilitate the insertion of the hinge lock mechanism components. After the hinge lock mechanisms are in place, the styrofoam is then covered with a thin sheet of material (laminate) such as Formica, vinyl, aluminium, etc. This type of panel is very light weight and can be assembled and disassembled into any desired display unit using many panels by a single person. This construction is very versatile and aesthetically pleasing because of the many types of laminate material that can be used.

In operation using the embodiment of FIGS. 1 and 3, the ends of panels 36 and 37 of a display unit are bevelled back to the desired angle. In the instance of a straight wall connection the ends of the panels are left in block form as shown at 50 in FIG. 1. FIG. 3 shows where the edges of the panels have been bevelled to form an angle. It should be noted that the desired angle is determined by the amount of bevelling of the edges of the panels (i.e., from 60 to 300 degrees). Passageway 100 (slightly larger than the arms 1 and 2 of the mechanism) is drilled into the ends of the panels to accommodate the arms of the mechanism and holes 110 is drilled into the face of one side of the panels to communicate with the passageway 100. In the instance where the variable locking mechanism of copending application Ser. No. 084,720 is used, it would be necessary to carve out a recessed groove in the end of the panels to hold the housing of the variable locking mechanism. When three panels are to be joined together (as in FIG. 7), it will be necessary to drill out a recessed groove to hold a washer 40 in order to hold panels 37 and 38 together before placing panel 36 onto arm 1. A floating nut retainer means 6 is inserted into the matching hole 110 in the adjacent panel. The passageway 11 of 3 and 22 of 6 are aligned with the passageway 100 drilled in the panels. The machine threads of arm 2 are inserted into the passageway 100 and screwed into floating nut retainer means 6 to the desired amount. The other panel is then inserted onto arm 1. Since the floating nut retainer means allows for adjustments, the arm can be moved somewhat in the passageway 100 to align the two panels so that the arm pass therethrough. when the panel is in place, the outer slope of the conical V shaped depression in the arm 1 is aligned with the channel 12 of 3. The set screw 9 is then tightened with a set screw wrench onto the outer slope of the conical V shaped depression urging arm 1 away from arm 2 (which is secured in panel 37) thus tightening the panels 36 and 37 together into position creating a tight continuous seam. If the edges are not perfectly aligned, the clamp-tightening means 3 can be loosened and the panels adjusted to effect a perfectly aligned seam and retightened. The floating nut retainer means 6 affords this fine-tune adjustment.

The hinge lock mechanism can be used to hinge lock any material such as wood, masonite, plastic or metal together to form almost any angle, preferably from 60 to 300 degrees angles. Regardless of what angle is desired, the hinge lock mechanisms can be adjusted with the panel joints remaining tight. This is accomplished by bevelling the ends of the panels that are to form the joints. Hence, when viewing the panels at the joints from the desired side of the panels the only thing that is seen is a seam regardless of what angle the panels are in. And on the opposite side of the panels where the housings of floating nut retainer means and the clamp tightening means are seen, they will be in finished form.

It will be seen that the present invention provides a new and useful hinge lock mechanism for joining two or more members together having desireable advantages and characteristics, including those pointed out herein, and others which are inherent in the invention. It is contemplated that those skilled in the art may make certain modifications and changes in the hinge lock mechanism described herein without departing from the spirit of the invention or the scope of the appended claims.

What is claimed:

1. An improved hinge lock mechanism for joining two or more panels together at any angle comprising at least two arms joined together at an angle wherein one arm has means for securing it into one panel and another arm has an exaggerated conical V shaped depression thereon that communicates with a clamp-tightening means for securing the another arm into a second panel, the clamp-tightening means comprising a housing with anchoring fins thereon, a horizontal passageway through the housing which the another arm passes, a perpendicular threaded channel in the housing, and a set screw with a conical shaped end that has the same slope as that of the conical V shaped depression, said set screw rides in the perpendicular threaded channel, wherein when the another arm is secured in the second panel, the perpendicular threaded channel in the housing of the clamp-tightening means is aligned over an outer slope of the conical V shaped depression of the another arm and the set screw is tightened against the outer slope of the another arm urging the another arm away from the one arm so that the two panels are tightened and locked together creating a tight and continuous seam.

2. The improved hinge lock mechanism of claim 1 wherein the means for securing the one arm into one panel is machine threads on the one arm and a floating nut retainer means for holding the one arm comprising a housing with anchoring fins thereon for securing the housing into the panel, a loosely fitting nut having a threaded hole in its center located in a slightly oversized rectangular shaped channel to the housing so that the nut fits loosely, and a horizontal passageway through the housing which is slightly larger than the threaded hole of the nut, wherein the one arm is held in place by screwing the one arm through the floating nut retainer means yet the hinge lock mechanism moves freely in the passageway for making adjustments for aligning the another arm in the passageway.

3. The improved hinge lock mechanism of claim 1 wherein the means for securing the one arm into one panel is wood screw threads on the one arm wherein the one arm is screwed directly into the one panel.

4. The improved hinge lock mechanism of claim 1 where the at least two arms are joined together at a fixed angle of from about 60 degrees to about 300 degrees.

5. The improved hinge lock mechanism of claim 1 wherein the at least two arms are joined together at an angle by a swivel that makes the arms assume any angle that the panels are bevelled back to form.

6. The improved hinge lock mechanism of claim 5, wherein the means for securing the one arm into one panel is a socket with threads therein in the swivel joint and a means that screws into the socket for holding the arm in place.

7. The improved hinge lock mechanism of claim 1 wherein the outer slope of the exaggerated conical V shaped depression as measured from a horizontal plane is an angle in the range from about 25 to about 50 degrees.

8. The improved hinge lock mechanism of claim 1 wherein the means for securing the one arm into one panel is a slanted, flat surface on the one arm and a fastening means that communicates with said stanted, flat surface comprising a cylindrical shaped housing with a horizontal hole therein for receiving the one arm and a downwardly slanted hole with threads therein that is substantially vertically oriented and communicates with the horizontal hole, and a set screw means situated in the downwardly slanted hole for tightening against said one arm for locking said arm into a panel.

* * * * *